United States Patent [19]

Merrell

[11] Patent Number: 5,024,768
[45] Date of Patent: Jun. 18, 1991

[54] ORGANIC POLYMER ACTIVATOR FOR DETACKIFICATION

[75] Inventor: Gene A. Merrell, Huntingdon Valley, Pa.

[73] Assignee: Betz Laboratories, Inc., Trevose, Pa.

[21] Appl. No.: 358,296

[22] Filed: May 26, 1989

Related U.S. Application Data

[63] Continuation-in-part of Ser. No. 327,846, Mar. 23, 1989, which is a continuation-in-part of Ser. No. 161,866, Feb. 29, 1988, Pat. No. 4,853,132.

[51] Int. Cl.$^5$ ................................................ C02F 1/56
[52] U.S. Cl. .................................. 210/712; 55/85; 210/728; 210/736; 252/180
[58] Field of Search ............... 55/85; 134/38; 210/712, 210/725, 727, 728, 735, 736; 252/180, 181; 427/331

[56] References Cited

U.S. PATENT DOCUMENTS

| | | | |
|---|---|---|---|
| 3,515,575 | 6/1970 | Arnold | 117/102 |
| 3,990,869 | 11/1976 | Forney | 55/19 |
| 4,067,806 | 1/1978 | Mauceri | 210/52 |
| 4,130,674 | 12/1978 | Roberts et al. | 210/729 |
| 4,185,970 | 1/1980 | Dean | 55/89 |
| 4,220,456 | 9/1980 | Block | 55/85 |
| 4,440,647 | 3/1984 | Puchalski | 210/712 |
| 4,600,513 | 7/1986 | Mizutani et al. | 210/712 |
| 4,629,572 | 12/1986 | Leitz et al. | 210/714 |
| 4,637,824 | 1/1987 | Pominville | 55/85 |
| 4,656,059 | 4/1987 | Mizuno et al. | 427/345 |
| 4,668,404 | 5/1987 | Walterick | 210/736 |
| 4,686,047 | 8/1987 | Arots | 210/712 |
| 4,753,738 | 6/1988 | Huang | 210/734 |
| 4,764,561 | 8/1988 | Kiss et al. | 55/85 |
| 4,853,132 | 8/1989 | Merrell et al. | 210/712 |

Primary Examiner—Peter Hruskoci
Attorney, Agent, or Firm—Alexander D. Ricci; Gregory M. Hill

[57] ABSTRACT

A process for detackifying paint, lacquer or enamel in a paint spray booth in which water is used to wash the air containing oversprayed paint, lacquer or enamel particles. The process comprises adding to the wash water a sufficient amount for the purpose of a cationic organic polymer and a selective anionic organic polymer. The process is particularly adaptable to activator catalyzed treatment programs in which the inorganic anion is lost as a precipitate due to adverse conditions such as increasing wash water acidity. The substitution of an organic anionic polymer for the inorganic anion alleviates this problem.

7 Claims, 3 Drawing Sheets

AMORPHOUS SILICA SOLUBILITY vs. pH 1600 ppm DH-1444

ORGANIC POLYMER ACTIVATOR FOR DETACKIFICATION

This is a continuation-in-part of Ser. No. 07/327,846, filed Mar. 23, 1989, which is a continuation-in-part of Ser .No. 07/161,866, filed Feb. 29, 1988, now U.S. Pat. No. 4,853,132.

FIELD OF THE INVENTION

This invention relates to an improved method for treating paint wastes and paint oversprays encountered in wet paint spray booths or any areas where these wastes and oversprays exist.

BACKGROUND OF THE INVENTION

The spray painting of automobile bodies, truck engines, appliances and other industrial goods is customarily carried out in enclosed areas called paint spray booths (PSB). These booths act to contain solvent fumes and oversprayed paint and to reduce the chances of dust contamination in order to protect the paint booth operators. These booths vary in size, but are somewhat basic in their design and operation. A typical booth would thus consist of a work area, back section with mist eliminators and a sump.

The units to be painted generally pass through the work area while an air flow makes the oversprayed paint contact either the sump water or the spray from the water curtain. The air is scrubbed with recirculated water at the water curtain, passes through the mist eliminators and is removed by an exhaust fan.

Even though paint transfer efficiencies have increased through improved application technologies, roughly one-half of all paint sprayed does not reach its intended article. As a result, a significant concentration of paint builds in the system and agglomeration can occur. The resultant mass is a sticky, tacky material which can plug the mist eliminators, shower heads and even recirculating pumps. When this happens, scrubbing efficiency decreases leading to potentially hazardous conditions of unchecked paint emissions being discharged into the atmosphere. Such conditions may also present severe safety hazards to paint spray booth operators.

This process involves other problems. These tacky organic deposits are subject to bacterial growth and the proliferation of fungi. These conditions generate corrosion and odor problems. In addition, the paint solids that are recirculated can form suspensions in the water which remain tacky and can create expensive separation and disposal problems.

These problems show, therefore, the desirability to treat PSB water systems so as to reduce or prevent as much as possible the agglomeration and deposition of oversprayed paint on critical PSB operating parts, to render the resultant sludge non-tacky and easily removable and to provide a water quality such that it can be recycled for use in the system.

Another problem associated with paint detackification and separation from the paint spray booth water wash system is the disposal cost associated with removal of the resulting paint sludge. For economic reasons, it is highly desirable to provide a PSB chemical treatment that results in high solids (low moisture) sludge with a reduced or low volume sludge so that disposal costs may accordingly be minimized.

PRIOR ART

Many and varied chemical treatments have been proposed for detackifying the paint and providing a manageable sludge. In U.S. Pat. No. 3,515,575 (Arnold), it is suggested that the addition of at least 0.5 ppm of a water soluble polymer consisting of a simple hydrocarbon chain substituted with hydrogen, methyl, amide or carboxyl groups to a paint spray booth wash water containing alkali, wetting agents, absorbants and defoaming agents is effective at detackifying and collecting overspray paints.

U.S. Pat. No. 4,686,047 (Arots) discloses a detackifier for PSB's containing a resinous reaction product of a polymer of N-alkyl diallyl amine hydrohalide plus epihalohydrin. Arots demonstrates this technique with polymer levels of 4 to 40% based on oversprayed paint and where the pH is adjusted to at least 6.

U.S. Pat. No. 4,440,647 (Puchalski) discloses a paint spray booth composition consisting of a polyamide-epichlorohydrin resin, a polymer formed from reacting hexamethylene diamine and ethylene dichloride. An amphoteric metal salt is also added. The pH of the wash water is regulated to basic by the addition of sodium silicate. A similar approach is disclosed in U.S. Pat. No. 4,637,824 (Pominville) in which a paint spray booth detackifier is disclosed where the pH of the wash water is adjusted to between 7 and 12 by an alkali metal silicate. Furthermore, Pominville requires the addition of an amphoteric metal salt and a polydiallyl dimethyl ammonium halide.

There are additional treatment programs similar to Puchalski and Pominville. Mizutani et al, U.S. Pat. No. 4,600,513, disclose a PSB detackifier consisting of an alkali metal zincate added to the wash water along with a cationic amine. In U.S. Pat. No. 4,067,806 (Mauceril, a paint spray booth detackifier is disclosed consisting of the addition of an amphoteric metal salt and the polymerization product of diallyl dimethyl ammonium chloride, N-vinyl-2-pyrolidone and acrylamide. Similarly Forney, U.S. Pat. No. 3,990,869, discloses a paint spray booth detackifier consisting of a polycationic polymer added to the wash water along with an amphoteric metal salt and where the pH is adjusted to between 7.5 and 10.5.

U.S. Pat. No. 4,656,059 (Mizuno et al) discloses a colloidal solution of a melamine aldehyde resin with pH adjustment to provide detackification. Other materials are added to improve the performance of the detackifier, such as a surface active agent for improving paint dispersibility, a flocculant for improving solid-liquid separating properties and, most notably, an alkali agent to diminish tackiness.

Other patents of minor interest to the present application disclose the addition of various clay substances to a wash water whose pH is regulated to greater than 10. Representative examples of this teaching include U.S. Pat. Nos. 4,185,970 (Dean), 4,220,456 (Block), and 4,629,572 (Leitz et al).

GENERAL DESCRIPTION OF THE INVENTION

The above and other problems in the field of paint spray booth chemical treatments are addressed by the present invention. It has been discovered that the precipitate formed by the activation of cationic polymers by various organic anions is effective at detackifying and conditioning oversprayed paint.

The invention comprises a composition and process for detackifying and coagulating paint, lacquer and enamel found in spray booths in which water is used to wash air in the booth and remove oversprayed paints, enamels or lacquers and where the water is recirculated for further washing of the air in the spray booth. The inventive process comprises the addition of a water soluble cationic polymer in combination with a water soluble organic anion. The anion reacts with the cationic polymer to produce a precipitate which in turn detackifies and coagulates the paint, lacquer or enamel to provide a paint sludge that is high in solids and low in volume. It should be understood that blends of cationic polymers are within the purview of this inventive concept and its practice.

The effectiveness of the combination of cationic polymer and organic anion can be determined by a simple procedure which is disclosed in detail herein below.

The cationic polymers and the organic anions may be added to the paint spray booth wash water system on a continuous or on a "shot feed" basis.

BRIEF DESCRIPTION OF THE DRAWINGS

FIGS. I-III illustrate the effect of pH and aeration on dissolved silicate concentration.

DETAILED DESCRIPTION OF THE INVENTION

Figure 1:
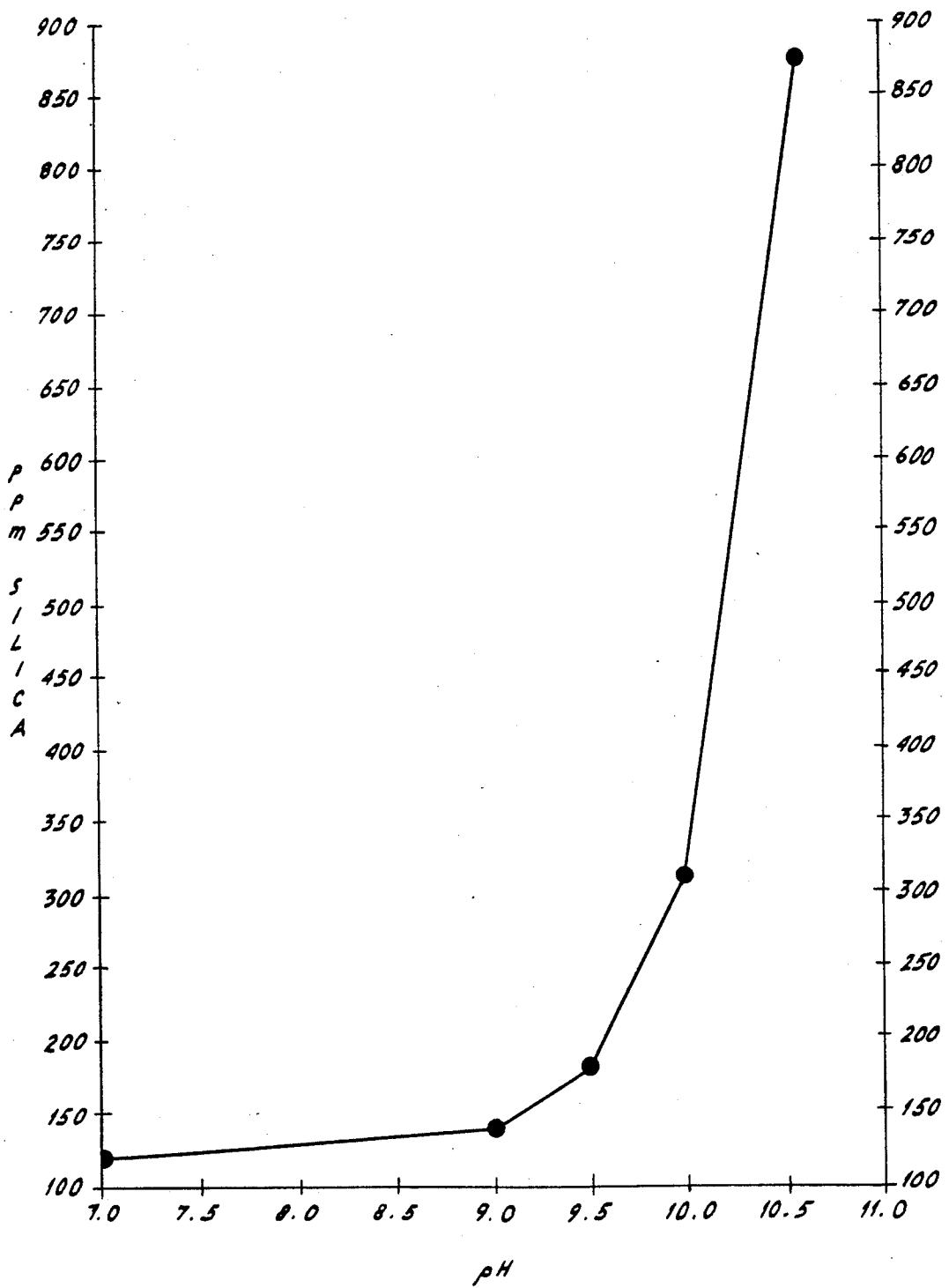
Figure 2:
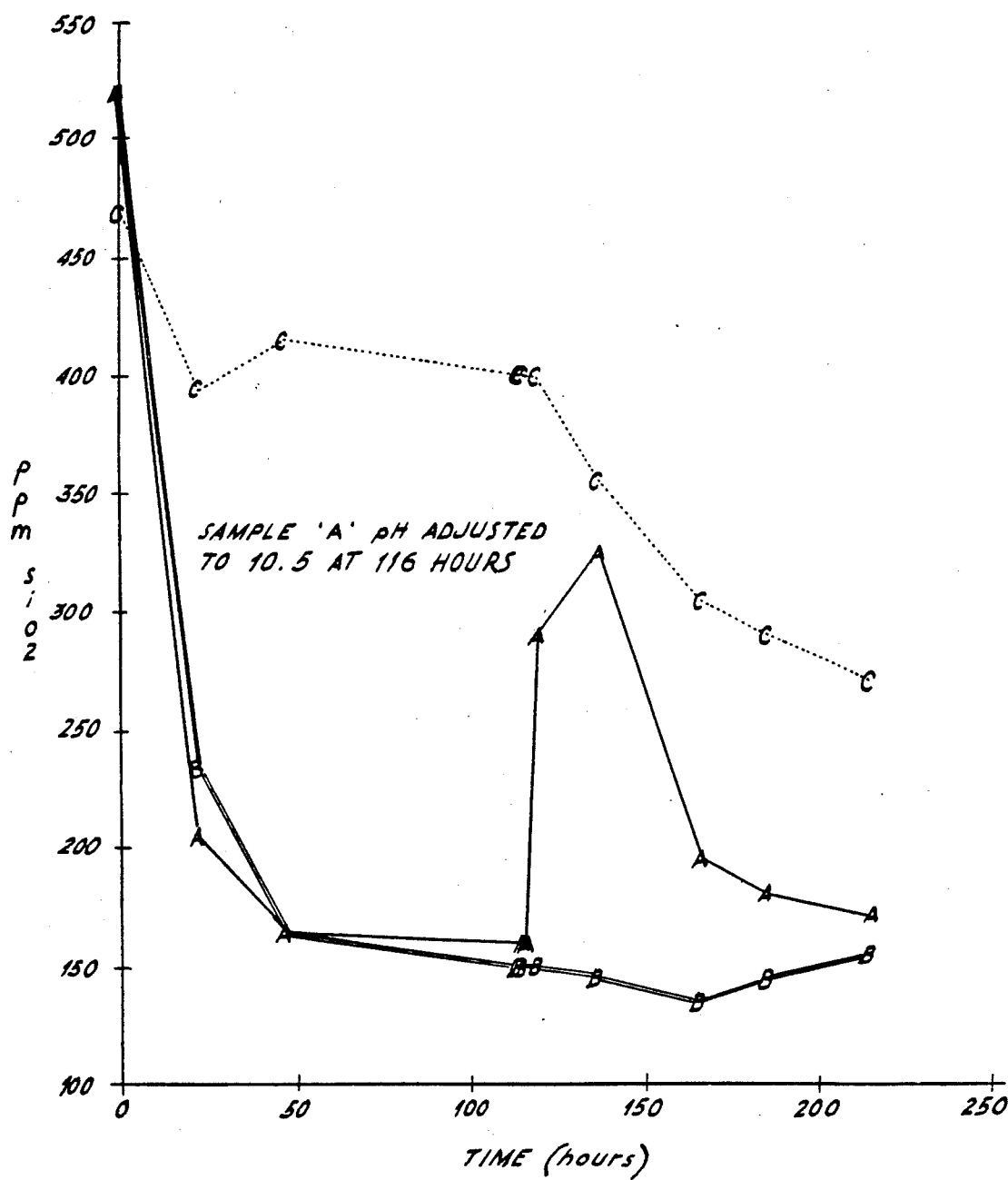
Figure 3:
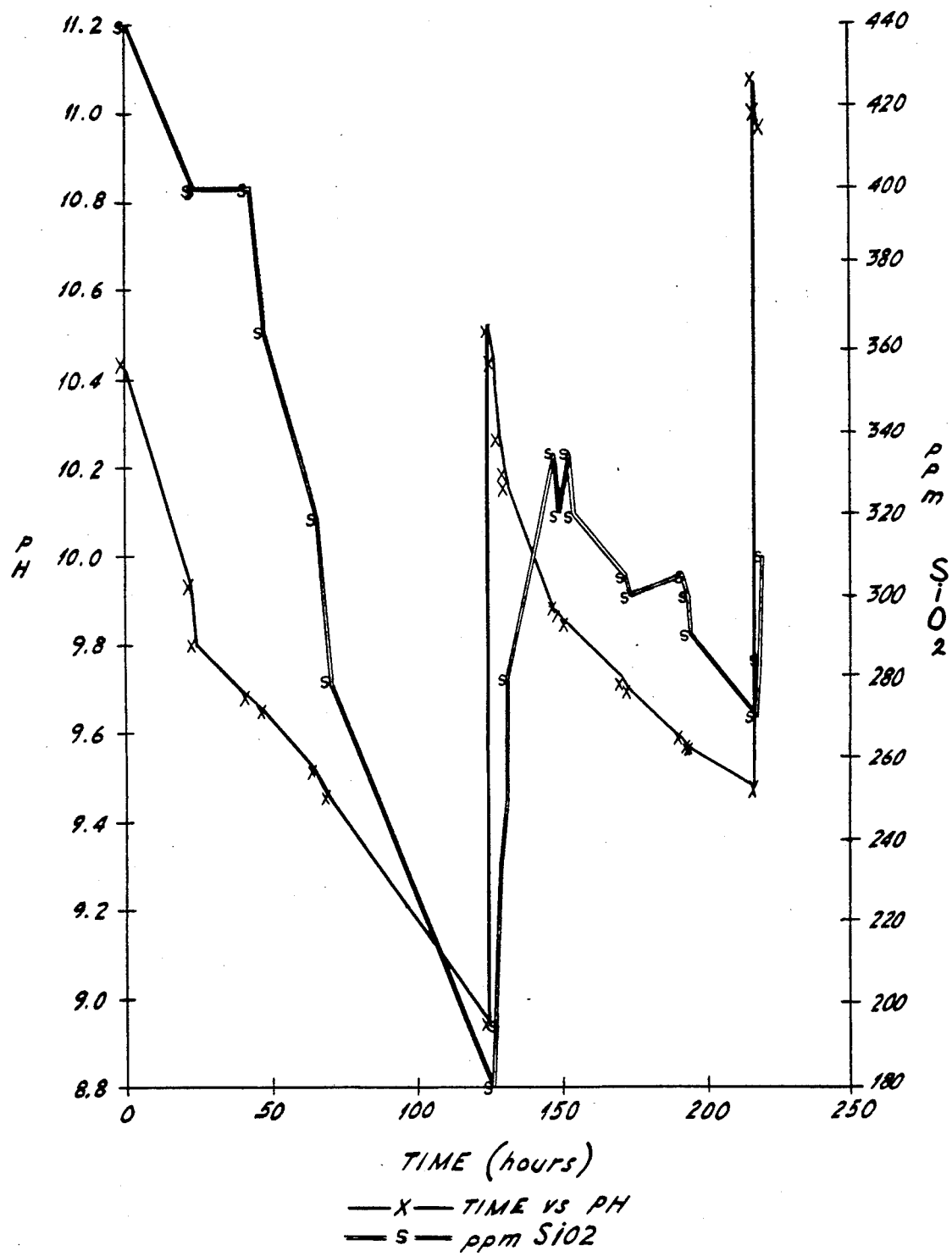

It is an object of the present invention to provide a paint spray booth treatment program that effectively detackifies paint, provides a paint sludge that is high in solids and of low volume, reduces or eliminates corrosion (such as the chlorides contained in the treatment programs of Forney, Mauceri and Puchalski), contains no known hazardous ingredients (such as residual free formaldehyde, a carcinogen, contained in Mizuno and Leitz, and the amphoteric metals as disclosed in Pominville, Puchalski, Mauceri and Forney).

It is a further object of this invention to provide a solution to the loss of the silicate anion in an activator catalyzed detackification program, or ACDP. In ACDP, a caustic silicate is used to activate cationic polymers for use as paint detackifiers. The silicate anion from the caustic silicate interacts with the cationic polymer to form a complex species which is responsible for detackification. During the detackification process, the silicate anion is released and becomes available for further cationic polymer activation. This "recycling" of the silicate anion is the basis for the catalyzed terminology.

Silicate is not consumed in the detackification process but other avenues of silicate loss exist. These include loss with water removed from the system in the wet sludge, loss through reaction and precipitation with water hardness cations such as calcium and magnesium and loss with system blowdown or drift out the exhaust. These losses can be predicted and partially controlled.

In the commercial application of this technology, however, an unexpected high rate of silicate loss is experienced. This is caused by pH suppression which, in turn, is caused by $CO_2$ adsorption during aeration of the wash water. The solubility of silicate is strongly dependent on the pH of the solution (see FIG. I). At typical use concentrations, expressed as ppm silica, the solution is buffered by the silica to a pH of about 10.3. As the pH of the solution decreases, the concentration of silicate drops due to a corresponding reduction in the solubility of silica.

FIG. II illustrates the effect of aeration on silicate concentration. Air is bubbled through aqueous solutions of $SiO_2$. The concentration of dissolved silicate rapidly decreases with time and aeration. Both curves A and B appear to reach a limiting silicate concentration of about 150 ppm silicate, as $SiO_2$. Without aeration, curve C, the silicate concentration drops much more slowly. Sample C was merely open to the atmosphere, which still allowed for the adsorption of $CO_2$ but at a much lower rate than samples A & B. At 116 hours, the pH of sample A was adjusted to 10.5 using NaOH. The dissolved silicate concentration began to increase, but did not return to its initial value because the pH does not remain at 10.5 long enough to allow this to occur.

FIG. III illustrates further the dependence of pH and dissolved silicate concentration on aeration. Over time, aeration reduces both pH and silicate concentration. At 125 hours, the pH of the solution was increased to its original value by the addition of NaOH. As noted before, the increase in pH yields an increasing silicate concentration. In an additional test, the pH was maintained at 10.5 throughout the aeration period and, as expected, there was no measurable loss of dissolved silicate.

As is readily apparent from the foregoing discussion, aeration reduces silicate concentration by reducing the solution pH. This mechanism of silicate anion loss could be eliminated by controlling the pH of the booth water. However, this is not desirable due to the necessity of additional chemical handling and process monitoring and control. It is more advantageous to replace the silicate anion activator with another activator that will not be susceptible to the aeration effect.

In accordance with the present invention, it has been discovered that the use of specific organic anions in conjunction with organic cationic polymers provides improvements over the treatment programs disclosed and the problems identified above. The appropriate combination of organic anion and organic cation is determined by the test method disclosed below. The organic anion activates the organic cation to form a precipitate. It is this activated precipitate that detackifies the paint and conditions the paint sludge for proper removal.

In an effort to overcome anionic activator loss, it has been discovered that polymers of organic anions have been particularly effective at detackifying paint and conditioning the paint sludge. Found to be particularly effective according to the present invention are:

Maleic anhydride/diisobutylene copolymer
Maleic anhydride polymer
Polyacrylic acid The active water soluble or water dispersible cationic polymer or cationic polymer blends of the present invention may be described as condensation or addition polymers being of medium to low molecular weight, having a high charge density, crosslinked or linear. The molecular weight range active in this invention is between about 1,000 and 600,000 average molecular weight. The charge densities, as determined by the PVSK Colloid Titration Method (H. Terayama, Kayaku no Kenkya, Vol. 1, p. 75, 1948; H. Terayama, Kayaku no Kenkya, Vol. 4, p. 31, 1949; R. Senju, "Koroido Tekiteiho", Nankodo, Tokyo, 1969), are active in the range of about 1.5 to 12. meq/g active polymer.

The specific cationic polymers identified below are known to exhibit the desired performance characteristics.

| Polymer | Cationic Polymer |
|---|---|
| I. | Dimethylamine-epichlorohydrin |
| II. | Polydiallyldimethylammonium chloride |
| III. | Condensation product of hexamethylenediamine still bottoms plus ethylene dichloride |
| IV. | Condensation product of dimethylamine plus epichlorohydrin plus ethylene diamine |

| Polymer | Polymer Blend |
|---|---|
| V. | Dimethylamine-epichlorohydrin/polydiallyldimethylammonium chloride  Ratio: 3/1 |
| VI. | Condensation product of hexamethylenediamine still bottoms plus ethylene dichloride/condensation product of dimethylamine plus epichlorohydrin plus ethylene diamine  Ratio: 3/1 |
| VII. | Dimethylamine-epichlorohydrin/condensation product of dimethylamine plus epichlorohydrin plus ethylene diamine  Ratio: 1/1 |
| VIII. | Condensation product of dimethylamine plus epichlorohydrin plus ethylene diamine/polydiallyldimethylammonium chloride  Ratio: 3/1 |

As the present invention is practiced, an aqueous solution of the organic anion polymer and an aqueous solution containing the cationic polymer are added separately to the paint spray booth recirculating water before the introduction of the overspray paint. The solutions can be admitted to the paint spray booth system at varied locations including: the pump, upstream from the pumps, or at any advantageous position along the circulating water system.

The solutions of organic anion polymer and cationic polymer are either shot fed or continuously fed to the paint spray booth water system. The organic anion polymer is chosen based on the paint type, cationic polymer, system mechanical design, and the operating parameters of the specific plant. In general, the organic anion polymer treatment level will be in the range of 10 ppm–10,000 ppm. Although the cationic polymer treatment level is dependent on many factors (paint type, water chemistry, organic anion chosen, etc.), the operable dosage rate of the cationic polymer will generally be in the range of 0.5 ppm –500 ppm active polymer. Preferably, the organic anions of the present invention are added within the range of 50 ppm –10,000 ppm and the cationic polymers are added within the range of 5 ppm –400 ppm active polymer.

Paint, as used herein, is a broad-based term used to describe the coating applied to a given object. Paints are normally composed of a film former (the resin which forms the coating), a solvent or carrier (water or organic), pigments (for color), and additives such as biocides, drying agents, viscosity modifiers, etc. In general, the solvent is used to classify the paint type: either water base or oil base. Technically, if the paint forms its coating by evaporation of the solvent without chemical reaction, it is a lacquer. If the coating is formed via crosslinking, it is an enamel.

EXAMPLES

Jar Testing Procedure

A standard jar test procedure is used to determine the operable and proper combinations of cationic polymer and inorganic anion. The general procedure is to add 100 ml of tap water to a 120 ml jar. The treatments are added, and the bottle capped and shaken tn mix the contents and coat the internal surfaces of the jar with the treated water. One (1) ml of paint is added to the jar. After vigorous shaking for 30 seconds, a wooden tongue depressor is immersed in the solution and then removed for examination. The following guidelines are used for examining the detackification performance of the treatment.

| Rating | Definition |
|---|---|
| Fail | Paint forms large tacky globules and/or coating which adheres to the exposed surfaces of the jar and tongue depressor. |
| Poor | Paint forms agglomerates which are slightly tacky or smeary to touch, or upon crushing. Paint sludge coats the tongue depressor. |
| Fair | Paint forms granular flocs or globules which adhere to less than 10% of the exposed surface area of the jar or depressor. Sludge may be smeary, but not tacky. |
| Good | Paint form particles or globules, some of which appear as specks on less than 1% of the exposed surface area of the jar or depressor. Sludge is neither smeary nor tacky. |
| Excellent | Paint forms particles which do not adhere to the exposed surfaces of the jar or depressor. The paint sludge may float, sink, or be dispersed in the water. |

Tests were conducted using various organic anionic polymers with the cationic polymer under the parameters defined below. Standard jar test procedures were observed. The paint used was a high solids automotive base coat.

| Organic Anionic Polymers | | |
|---|---|---|
| Polymer Type | Molecular Weight | Active Solids |
| Diisobutylene/maleic anhydride | 15,000 | 25% |
| Maleic anhydride | 1,500 | 50% |
| Polyacrylic acid[1] | 243,000 | 25% |
| Polyacrylic acid[2] | 104,000 | 37% |
| Polyacrylic acid[3] | 5,100 | 50% |
| Polyacrylic acid[4] | 2,100 | 65% |

[1] Available as Goodrite K-702
[2] Available as Goodrite K-722
[3] Available as Goodrite K-732
[4] Available as Goodrite K-752

Test 1: Cationic polymer type VII was added at a concentration of 300 ppm. The maleic anhydride polymer was tested over the range of from 1,500 to 10,000 ppm. This combination and concentration range yielded good detackification. Below 1,500 ppm of maleic anhydride, detackification performance degraded significantly.

Test 2: Cationic polymer type VII was added at a concentration of 300 ppm. The polyacrylic acid polymer with a molecular weight of 243,000 was tested over the range of from 1,000 to 10,000 ppm. This combination and concentration range yielded Fair-Good detackification.

Test 3: Separate samples of 1,000 ppm diisobutylene/maleic anhydride anionic polymer were tested individually with a 400 ppm concentration of each cationic polymer type V, VI, VII and VIII. In all four samples, the detackification performance warranted an excellent rating.

Test 4: The variety of different molecular weight polyacrylic acid polymers were tested at concentrations to provide an actives level equivalent to the polyacrylic acid polymer with a molecular weight of 243,000 at a concentration of 1,000 ppm. Cationic polymer type VII was added at a concentration of 400 ppm. The results are as follows:

| Polyacrylic Acid Molecular Weight | Concentration, ppm | Detackification |
|---|---|---|
| 243,000 | 1,000 | Good |
| 104,000 | 700 | Fair–Good |
| 5,100 | 500 | Fail |
| 2,100 | 400 | Fail |

The results of test 4 indicate that the efficacy of various anionic organic polymers, such as in this case polyacrylic acid, is dependent upon its molecular weight. Here, the larger molecular weight polymer provided a more effective detackification cationic/ anionic polymer pairing than did the lower molecular weight species. This observation may not be universally applied to all anionic organic polymers since the maleic anhydride polymer of test 1 proved to be very efficacious at a comparatively low molecular weight of 1,500.

Further evaluation of this observation yielded the following results. Tests were conducted according to the same procedures outlined above with the polyacrylic acid having a molecular weight of 5,100 at concentrations of 100, 50 and 10 ppm. At these lower levels, detackification improved from Fail, as shown for 500 ppm in test 3, to Fair. These results suggest that this particular polymer results in overtreatment of this system at 500 ppm. The success of any activator catalyzed detackification program is sensitive to the molar concentration of the anionic organic polymer. Testing according to the method disclosed previously, or any similar method, is necessary to establish the proper organic anionic/organic cation pairing to provide the most effective detackifier for the specific treatment condition.

Although the efficacy of the present invention has been demonstrated by a limited number of inorganic anionic/cationic polymer combinations on a small number of paint types, the skilled artisan will appreciate that combinations of inorganic anions with cationic polymers will prove effective, in accordance with the invention, for the wide range of paints sprayed in wet paint spray booths.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A process for detackifying and coagulating paint, lacquer or enamel in a spray booth in which water is used to wash air in said booth in order to remove oversprayed paints, lacquers or enamels from said water prior to the recirculation of said water for the further washing of air in said spray booth comprising the steps of adding to said water at least about 300ppm of a water-soluble or water-dispersible cationic organic polymer selected from the group consisting of:
   dimethylamine-epichlorohydrin,
   polydiallyldimethylammonium chloride,
   condensation product of hexamethylenediamine still bottoms plus ethylene dichloride,
   condensation product of dimethylamine plus epichlorohydrin plus ethylene diamine,
   dimethylamine-epichlorohydrin/polydiallyl dimethyl ammonium chloride, in the ratio of about 3/1.
   condensation product of hexamethylenediamine still bottoms plus ethylene dichloride/condensation product of dimethylamine plus epichlorohydrin plus ethylene diamine, in the ratio of about 3/1,
   dimethylamine-epichlorohydrin/condensation product of dimethylamine plus epichlorohydrin plus ethylene diamine, in the ratio of about 1/1,
   condensation product of dimethylamine plus epichlorohydrin plus ethylene diamine/polydiallyl dimethyl ammonium chloride, in the ratio of about 3/1,
in selective combination with a sufficient amount for the purpose of an anionic organic polymer selected from the group consisting of:
   maleic anhydride,
   maleic anhydride/diisobutylene, and
   polyacrylic acid, wherein said sufficient amount of said maleic anhydride is at least about 1500ppm, wherein said sufficient amount of said maleic anhydride/diisobutylene is at least about 1000ppm, and wherein said polyacrylic acid has a molecular weight of at least about 243,000, and said sufficient amount of polyacrylic acid is at least about 1000pm.

2. A process according to claim 1 wherein said cationic organic polymer has a molecular weight of from about 1,000 to about 600,000.

3. A process according to claim 1 wherein said polyacrylic acid has a molecular weight of from about 243,000 to about 250,000.

4. A process according to claim 1 wherein said cationic organic polymer is added to said water at a concentration of from about 300 ppm to about 500 ppm active polymer.

5. A process according to claim 1 wherein said anionic organic polymer is added to said water at a concentration of from about 1500 ppm to about 10,000 ppm.

6. A process according to claim 1 wherein said cationic organic polymer comprises a blend of the condensation product of dimethylamine plus epichlorohydrin plus ethylene diamine/dimethylamine-epichlorohydrin and said anionic organic polymer is maleic anhydride.

7. A process according to claim 1 wherein said cationic organic polymer comprises a blend of the condensation product of dimethylamine plus epichlorohydrin plus ethylene diamine/dimethylamine-epichlorohydrin and said anionic organic polymer is polyacrylic acid.

* * * * *